(12) United States Patent
Sonnendorfer et al.

(10) Patent No.: US 9,540,023 B2
(45) Date of Patent: Jan. 10, 2017

(54) SHOPPING CART DISPLACEABLE BY HAND AND HAVING A DETACHABLE HANDLE

(76) Inventors: Horst Sonnendorfer, Puchheim (DE); Elvira Sonnendorfer, legal representative, Puchheim (DE); Andreas Filosi, legal representative, Puchheim (DE); Franz Wieth, Puchheim (DE)

(*) Notice: Subject to any disclaimer, the term of this patent is extended or adjusted under 35 U.S.C. 154(b) by 0 days.

(21) Appl. No.: 14/123,605

(22) PCT Filed: May 16, 2012

(86) PCT No.: PCT/EP2012/059134
§ 371 (c)(1),
(2), (4) Date: Feb. 23, 2015

(87) PCT Pub. No.: WO2012/163682
PCT Pub. Date: Dec. 6, 2012

(65) Prior Publication Data
US 2015/0197262 A1    Jul. 16, 2015

(30) Foreign Application Priority Data
Jun. 3, 2011 (DE) .................. 10 2011 104 321

(51) Int. Cl.
*B62B 3/02* (2006.01)
*B62B 3/14* (2006.01)
*B62B 5/06* (2006.01)

(52) U.S. Cl.
CPC . *B62B 3/02* (2013.01); *B62B 3/14* (2013.01); *B62B 5/06* (2013.01)

(58) Field of Classification Search
None
See application file for complete search history.

(56) References Cited

U.S. PATENT DOCUMENTS

| 4,720,048 | A | * | 1/1988 | Maroney et al. .......... 280/47.34 |
| 5,299,816 | A |   | 4/1994 | Vom Braucke et al. |
| 5,951,029 | A | * | 9/1999 | Sonnendorfer et al. . 280/33.992 |
| 6,139,029 | A | * | 10/2000 | Shaw .............................. 280/8 |
| 6,435,407 | B1 | * | 8/2002 | Fiordelisi ....................... 235/383 |
| 8,616,098 | B1 | * | 12/2013 | Rosow .................... B25G 1/102 16/430 |
| 2010/0133768 | A1 |   | 6/2010 | Sonnendorfer et al. |
| 2011/0062675 | A1 | * | 3/2011 | Brown .................... B62B 3/144 280/33.993 |

FOREIGN PATENT DOCUMENTS

| DE | 9114069 U1 | 1/1993 |
| DE | 29700857 U1 | 3/1997 |
| DE | EP 0854073 A1 * | 7/1998 ............ B62B 3/144 |
| DE | 29724850 U1 | 9/2004 |
| EP | 0854073 A1 | 7/1998 |
| WO | 2007062613 A1 | 6/2007 |

* cited by examiner

*Primary Examiner* — John Walters
*Assistant Examiner* — Hilary L Johns
(74) *Attorney, Agent, or Firm* — Laurence A. Greenberg; Werner H. Stemer; Ralph E. Locher

(57) ABSTRACT

A manually displaceable shopping cart, in particular a multilevel cart, includes a basket for receiving goods, two handle support arms each disposed at a respective side, and detached handles each attached to a respective handle support arm.

14 Claims, 3 Drawing Sheets

SHOPPING CART DISPLACEABLE BY HAND AND HAVING A DETACHABLE HANDLE

BACKGROUND OF THE INVENTION

Field of the Invention

The invention relates to a manually movable shopping cart, in particular to a multilevel cart, having a basket for the reception of goods, wherein the shopping cart comprises two handle support arms arranged one on each side.

Shopping carts equipped with a basket are used, above all, in the wholesale and retail trade. They are gladly used by the customers of these stores, since the basket, despite high holding capacity, reliably prevents the goods placed therein from falling out.

In order to set his cart in motion, the user normally grips a handle bar mounted transversely on the rear end of the shopping cart between two handle support arms. Generally one hand on the handle bar is sufficient to steer a lightly laden shopping cart through the store or to be able to speed it up. If two hands are used, then the further to the outside the handle bar is gripped, the easier it is to maneuver the shopping cart. If the handle bar, or the ends of the handle support arms, is/are clasped with the hands spread wide apart, then even heavily laden carts can still be controlled.

A handle bar thus offers the user of the shopping cart a large number of gripping options, which the user can select according to situation and preference. Shopping carts which additionally have upwardly pointing loop handles on the handle bar are also known. Such loop handles offer the user of the shopping cart further gripping variants. In addition, the handle bar offers sufficient space to enable functional modules to be fastened thereto, such as, for instance, advertising displays, deposit locks or shopping list holders. A further advantage is that the handle bar connects the two handle support arms one to the other. The forces acting on the handle bar can thus constantly be transmitted via both handle support arms. The handle bar thus improves the stability of the overall construction. It allows the handle support arms to be dimensioned smaller, so that a normal wire profile can be used as the handle support arm.

A handle bar can also be a hindrance, however, particularly if the basket of the shopping cart has an integrated child seat. In the collapsed state, the mechanism of the child seat generally protrudes beyond the upper rim of the basket. Additionally mounted automatic belt systems for the children again make the collapsed child seat assembly thicker. This becomes a problem if the shopping carts are intended to be pushed together into a line for space-saving purposes. The rear basket flap or the backrest of the shopping cart which is to be pushed into the line limits the insertion depth, since it bangs against the handle bar of the front shopping cart. If the shopping carts are pushed firmly one into another, there is even the danger of the child seat being damaged in the collision with the handle bar.

The spatial problem is intensified if the shopping cart is a multilevel cart, in which two baskets are arranged staggered one above the other. Due to the lack of basket depth, there is little fold-up space available to the child seat mounted in the top basket. This requires a complex three-part folding mechanism, which makes the collapsed child seat protrude significantly upward.

In order to increase the available insertion depth in shopping carts with a handle bar, DE 195 41 257 B4 proposes a fastening part for the handle bar, by which the handle axis of the handle bar is shifted further upward. As a result, the freedom of movement for the child seat or the rear basket flap is extended. A drawback with this is, inter alia, the increased assembly and production complexity for the necessary fastening parts.

Basketless trolleys, the flat loading surface of which rests directly on the transport frame and has no lateral boundaries, are also known. These trolleys are used, for instance, by DIY stores, in which heavy goods, or goods which are too bulky even for a large basket, must frequently be transported to the cash point. In order to additionally facilitate the loading and transport of such goods, no transverse handle bars are built into trolleys of this type. Instead they have two separate handle support arms, which are arranged on one side each of the loading surface and point vertically upward and to the respective end of which is fastened a likewise vertically upright loop handle.

The laterally elevated individual handles offer the advantage over a transversely oriented handle bar that the rear side of the loading surface is freely accessible. This simplifies rear loading and unloading of the trolley. Moreover, they leave space for a rearward protrusion of higher load. Furthermore, the shape of the loop handle, with its bracket placed ahead of the actual grip, ensures protection against injuries caused by articles sliding on the transport surface.

A drawback is the lack of variability for the user of the trolley. He is not capable of varying his grip. The handle support arms must also be made particularly stable, since, due to the lack of a stabilizing handle bar, the forces which arise at a handle support arm can only be dissipated via this same.

A handle bar thus simplifies the design of a shopping cart and, due to its manifold gripping options, makes it easier for the user to transport the cart. It can also, however, hamper the user. The shopping carts equipped with a basket are used predominantly, however, in situations in which the offered goods are neither so heavy that lifting into the basket presents difficulties, nor so large that they must necessarily protrude. Shopping carts equipped with a basket are therefore always equipped with a handle bar.

BRIEF SUMMARY OF THE INVENTION

The object of the present application is now to propose a shopping cart with basket in which the freedom of movement available in the rearward direction is increased.

This object is achieved by a manually movable shopping cart, in particular a multilevel cart, having a basket for the reception of goods. The shopping cart includes two handle support arms each disposed at a respective side, and detached handles each fastened to a respective handle support arm. Particularly preferred embodiments of the shopping cart are stated in the sub claims.

A fundamental basic concept of the invention is to design the manually movable shopping cart such that each handle support arm has a detached handle. Within the meaning of this application, by detached is meant a handle which is held solely on the handle support arm assigned thereto. In the shopping cart according to the invention, a handle bar is dispensed with. The detached handle is thus fastened only to the handle support arm.

This means that that space between the handle support arms and the basket which is otherwise covered by the transverse handle bar is at least very largely freed. In particular, the user can approach the basket from behind without being hampered in this by the handle bar as a projecting boundary. If a child seat is mounted on the basket flap, the child now no longer has to be lifted over a handle bar with outstretched arms in order to be put in. Furthermore, the laterally fitted detached handles make it easier for the user, who usually stands behind the shopping cart, to place goods into the basket.

The fitting of the shopping carts one inside the other into a line is also simplified. By virtue of the inventive design, it is possible to push the cart to be inserted, with its rear handle support arms projecting rearward on the basket and with the thereto fastened handgrips, past the side of the tilted-up rear basket flap or the collapsed child seat of the receiving cart. A danger of collision, and thus the danger of damage, no longer exists. Once the shopping carts are pushed together, only the handle support arms or handles of the shopping carts arranged one behind the other butt one against another. The distance apart in the line formation is determined purely by their shaping. Carts which can be pushed so closely together require significantly less space, so that less area has to be reserved for the collection station in or in front of the store.

Furthermore, the arrangement of the handgrips one on each side also offers optimal maneuverability, since, by holding onto the lateral handgrips, a maximal transmission of the lever forces is possible.

The handgrip according to the invention is of particular advantage when mounted on the tubular frame of a multi-level cart. The tubular frame is designed to securely support the top basket of the multilevel cart even in the filled state. With its stability, it is sufficiently dimensioned to be able to absorb the forces transmitted via the handles, even if there is no reinforcing handle bar. Even in the large and heavy multilevel carts, this can thus be relinquished without further measures.

In a preferred embodiment, the handle comprises a receiving fixture or mounting for a deposit lock. The receiving fixture or mounting for the deposit lock is then likewise arranged at the back and on the side of the shopping cart, so that the gained freedom of movement is not forfeited by the central fastening of further functional parts. The result is that, in addition to the deposit lock, also the associated fastening element for the deposit key is arranged on the side of the shopping cart. The deposit key, which hangs down from the fastening element when the shopping cart is transported, in this position neither gets in the way of the user with respect to walking or loading, nor does it restrict the free space for the legs of a child sitting in the child seat.

Preferably, the receiving fixture or mounting for a deposit lock is integrated into the handle. Integration into the handle facilitates the assembly of the shopping cart, since the handles can be supplied fully prefabricated for installation. A deposit lock accommodated in the handle is also better protected against damage.

In a particularly preferred embodiment, the handle is shaped ergonomically. If the handle, for instance, has a recess for the thumb, it is easier for the user to clasp and to better guide the shopping cart. A further ergonomic measure is to fasten the handle to the handle support arm such that it is tilted forward, which enables a more relaxed position of the hand. An inclination of the end of a handle arranged on the handle support arm, which end is facing away from the handle support arm, in the direction of the other handle is a further measure to improve the hand position during gripping and thus enhances the ergonomics of the handle. For this, the handle is preferably inclined between 5 and 45 degrees, in particular between 15 and 30 degrees, to the perpendicular.

In addition to the ergonomic construction of the handle, it is of advantage if a surface of the handle at least partially comprises a conductive plastic. If the hand clasping the handle comes into contact with the conductive plastic, the static charge generated in the advancement is dissipated via the handle. Such plastics have a certain proportion of electrically conductive material, such as, for instance, graphite.

It is likewise advantageous to improve the hygienic characteristics of the grip surface. If ion-emitting materials are woven into the surface of the handle, adherent germs are reliably killed. The user of the shopping cart is in this way protected from potentially harmful sticky residues from previous users. Such materials are known by the name sterions.

BRIEF DESCRIPTION OF THE SEVERAL VIEWS OF THE DRAWING

The invention is explained in greater detail below with reference to FIGS. 1 to 7, wherein.

DESCRIPTION OF THE INVENTION

Figure 1:
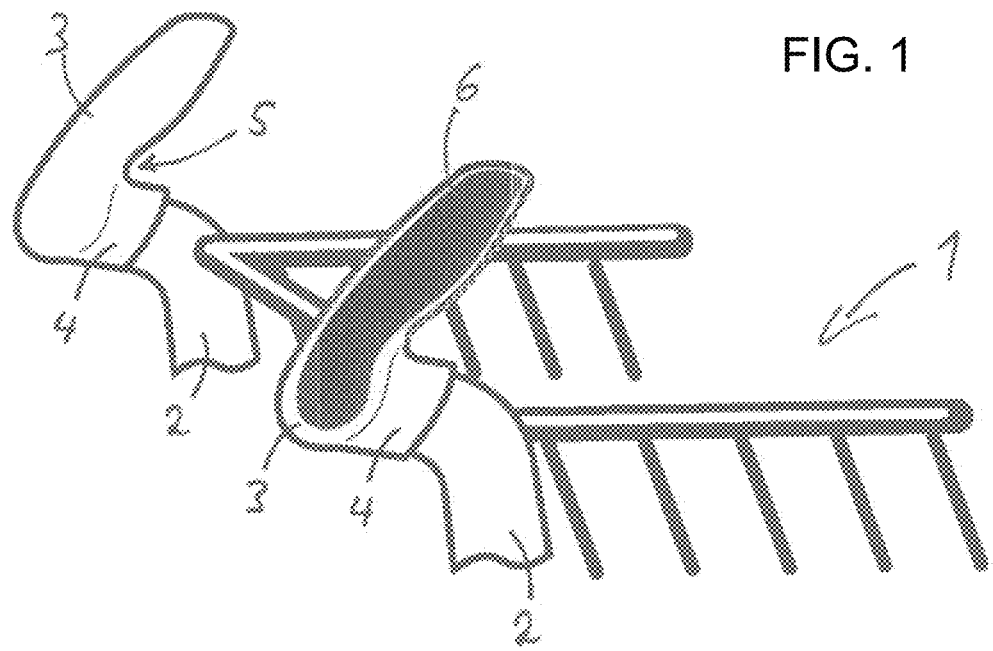
FIG. 1: shows a partial view of an illustrative embodiment of the inventively configured shopping cart.

The partial view represented in FIG. 1 shows a basket 1, which is outlined below. At the side of the basket, two handle support arms 2 project rearward and upward. Each handle support arm 2 bears an overall upward pointing handle 3. The handles 3 comprise a handle cap 4, which handle caps are drawn on the handles 3 so as to project over the handle support arms 2. In its region facing the basket 1, the handle 3 has an indentation 5, the lower region of which ends in the handle cap 4 and can be used as a rest for a side of the hand clasping the handle 3. In order to further improve the ergonomics, the handle 3 is angled forward.

A planar region 6 (here represented in black) of the grip surface has an electrically conductive material. The plastic is connected to the handle support arm, so that the person clasping the handle 3 in the region 6 is earthed and is protected against an electric shock through static charge.

Figure 2:
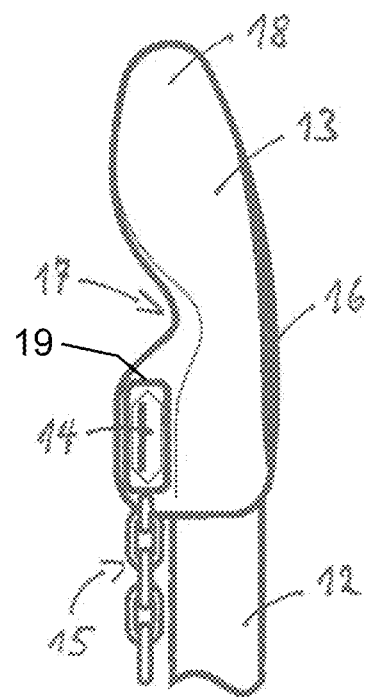
FIG. 2: shows a representation of one embodiment of a handle with integrated deposit lock.

FIG. 2 shows an embodiment of a right-hand handle. The handle 13 is fastened on the end of a handle support arm 12. On its side facing the opposite handle support arm, a deposit lock 14 is integrated into the handle 13 at a fixture or mounting 19. The fastening element for a deposit key (not shown here), which fastening element forms part of the deposit mechanism and is here in the form of a chain 15, is represented rudimentarily. The side region 16 comprising the electrically conductive plastic is clearly discernible.

The handle 13 has, virtually in a type of extension of the basket-facing indentation of the handle, a lateral indentation 17. The lateral indentation 17 allows further clasping of the handle 13, in particular with the little finger and the ring finger. The handle 13 can thus be clasped better, which makes it easier for the user, above all, to slow down the shopping cart or make changes in its direction. An area above the lateral indentation 17 forms a receptacle for parts of the ball of the thumb clasping the handle 13. This makes it possible for the user to comfortably support the hand clasping the handle 13. That end 18 of the handle 13 which is facing away from the handle support arm is inclined in the direction of the second handle support arm (not represented here) in order further to improve the ergonomics.

Figure 3:
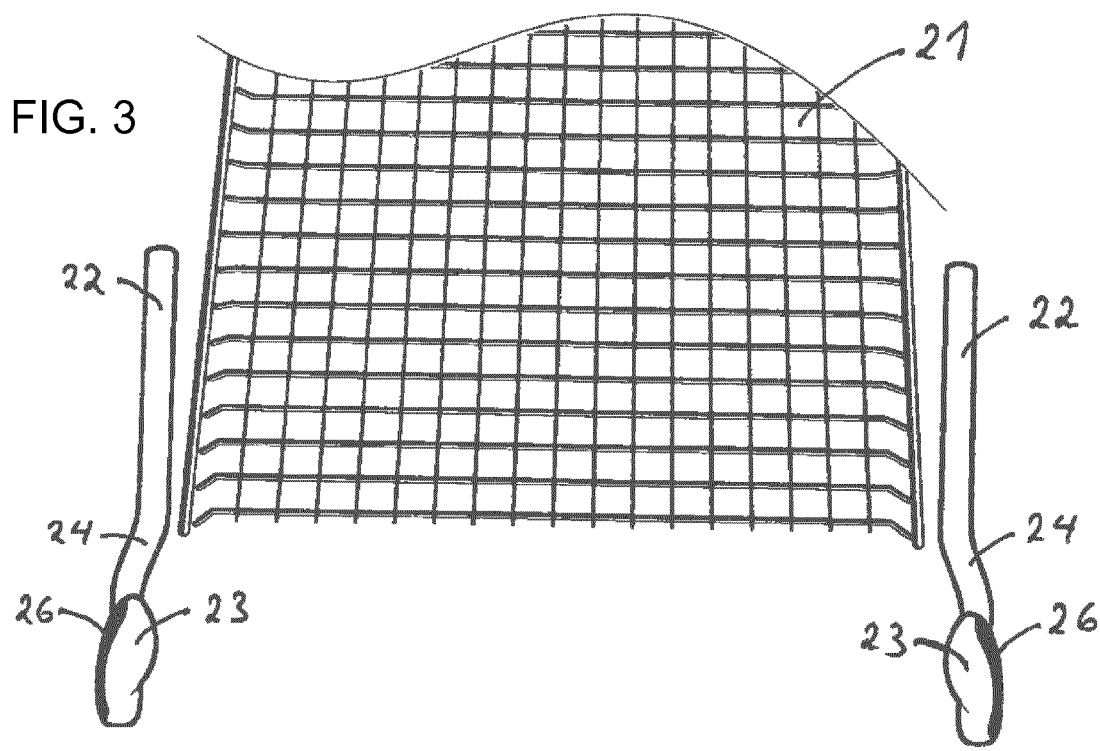
FIG. 3: shows a schematic view of a further embodiment of the shopping cart according to the invention.
Figure 4:
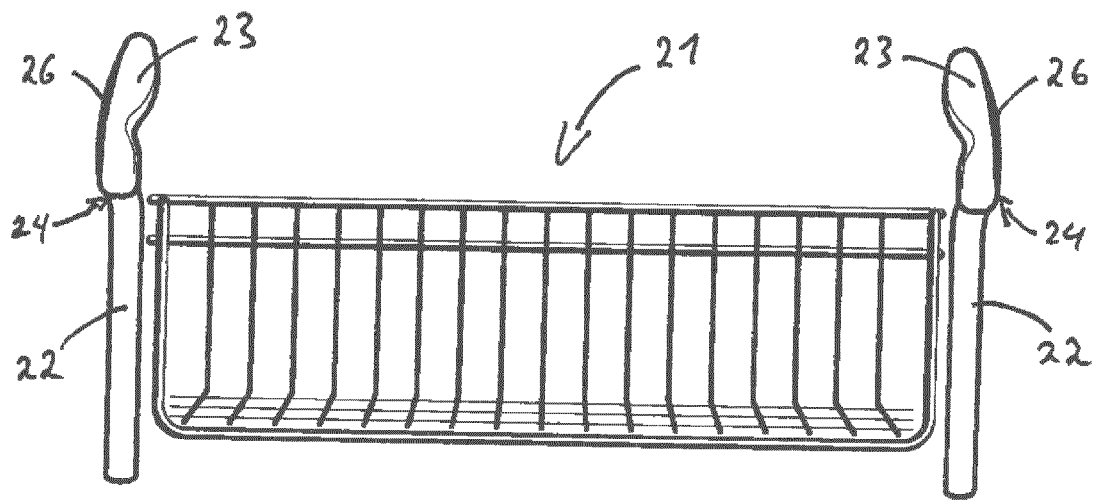
FIG. 4: shows a rear view of the shopping cart according to FIG. 3.

FIGS. 3 and 4 show sections of a further variant of the shopping cart according to the invention. In this variant, regions 24 of the handle support arms 22 are respectively flared outward. This shape of the handle support arms 22 enlarges the distance between the handles 23 of the shopping cart. The more widely situated handles 33 facilitate, in particular, the maneuvering of the generally large and heavy multilevel cart. At the same time, on each side, the distance between the handle and a side rim of the basket 21 is enlarged. When the multilevel cart is pushed into a line, a theoretically possible pinching of the hand, through carelessness, on elevated functional parts of the receiving cart is thus reliably avoided.

Figure 5:
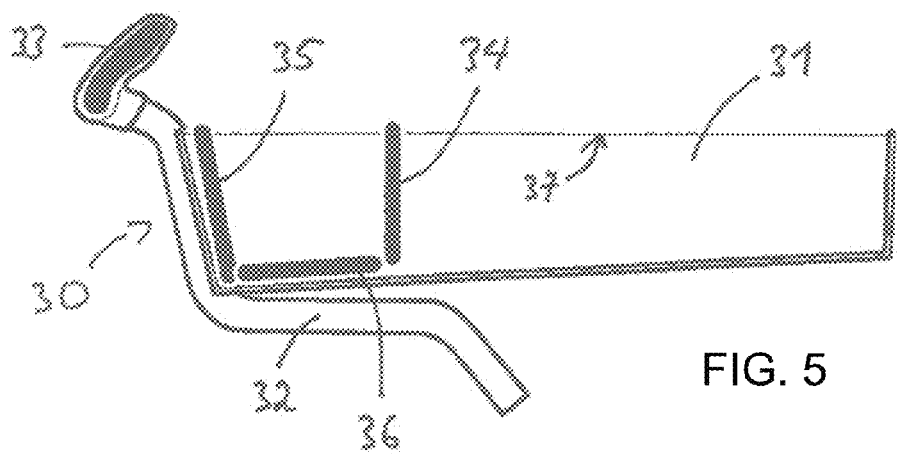
FIG. 5: shows a schematic representation of a further embodiment of the shopping cart according to the invention as a multilevel cart with folding seat mechanism.
Figure 6:
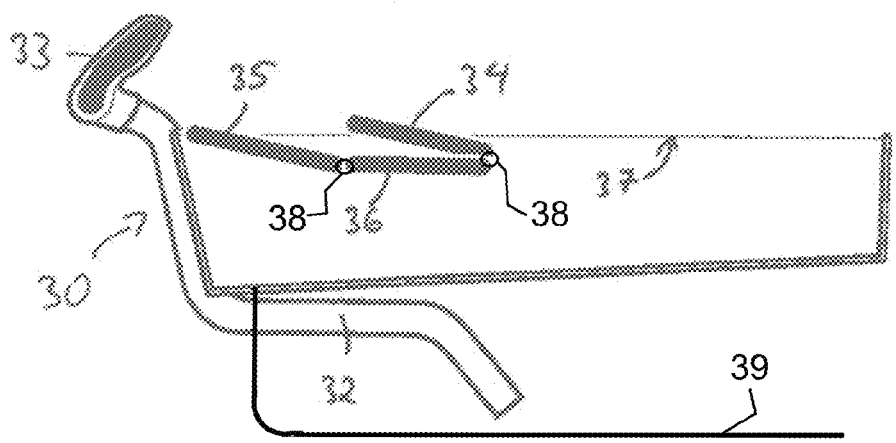
FIG. 6: shows a representation of the multilevel cart according to FIG. 5 with tilted-up child seat.
Figure 7:
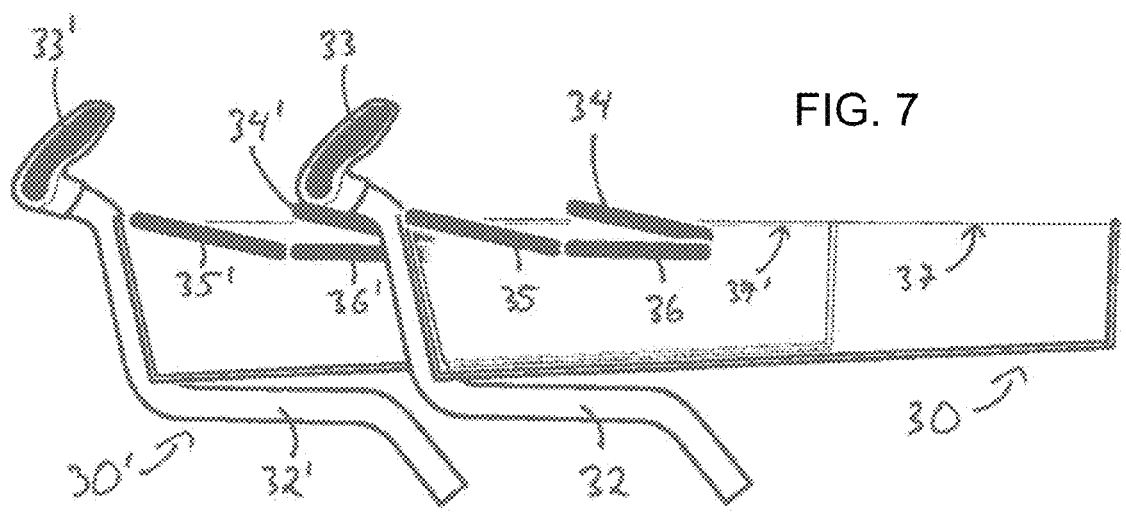
FIG. 7: shows two multilevel carts according to FIG. 5, fitted one inside the other.

FIGS. 5 to 7 show a schematic side view of one or two inventively configured multilevel carts 30. The top basket 31, parts of the handle support arm 32 and the handle 33 are respectively represented as well as a lower basket 39. Integrated into the top basket 31 is a hinged child seat mechanism. FIGS. 5 and 6 differ only by the position of the wire flaps 34-36 of the child seat mechanism. FIG. 5 shows it in its usage position, FIG. 6 in its collapsed position. In the collapsed position of the child seat, ends of the wire flaps 34 and 35, which have hinges 38, project clearly beyond the level 37 of the top basket 31, which level climbs gently to the end of the basket.

FIG. 7 shows the multilevel cart 30, into which a second multilevel cart 30' is inserted. The ends of the flaps 34' and 35' of the second multilevel cart 30' here jut out beyond the level 37 of the first multilevel cart 30. The inventive clearance between the handles 33 allows the ends of the flaps 34' and 35', despite their elevated position, to be pushed through between the handles 33 of the first multilevel cart. As a result, a close pushing together of the multilevel carts 30, 30' is enabled.

The invention claimed is:

1. A manually movable multilevel shopping cart, comprising:
    two sides;
    a front defining a forward direction;
    a top basket configured to receive goods, said top basket having an upper level;
    a child seat mechanism projecting beyond said upper level of said top basket;
    two handle support arms each disposed at a respective one of said sides; and
    detached handles each fastened to a respective one of said handle support arms and each being tilted in said forward direction permitting a plurality of multilevel shopping carts to be pushed closely together.

2. The manually movable shopping cart according to claim 1, wherein at least one of said handles includes a receiving fixture or mounting for a deposit lock.

3. The manually movable shopping cart according to claim 1, wherein at least one of said handles has a surface at least partially including an electrically conductive plastic.

4. The manually movable shopping cart according to claim 1, wherein one of said handles disposed on one of said handle support arms has an end facing away from said one handle support arm and being inclined in a direction toward the other of said handles.

5. The manually movable shopping cart according to claim 1, wherein said handles are oriented at least substantially vertically.

6. A detached handle for a manually movable shopping cart according to claim 1 having two sides, a basket and two handle support arms each disposed on a respective one of said sides.

7. The manually movable shopping cart according to claim 1, wherein said detached handles each have an end facing away from a respective one of said handle support arms, and said end of each one of said detached handles is inclined toward said end of the other of said detached handles.

8. The manually movable shopping cart according to claim 7, wherein said detached handles are inclined between 5 and 45 degrees to the perpendicular.

9. The manually movable shopping cart according to claim 7, wherein said detached handles are inclined between 15 and 30 degrees to the perpendicular.

10. The manually movable shopping cart according to claim 1, wherein said detached handles each have a respective recess for a thumb of a user.

11. The manually movable shopping cart according to claim 2, wherein said receiving fixture or mounting for the deposit lock is integrated into said at least one handle.

12. The manually movable shopping cart according to claim 1, wherein said child seat mechanism includes three wire flaps being hinged together between a usage position and a collapsed position, two of said wire flaps having ends projecting beyond said upper level of said top basket but permitting said ends of said flaps to pass between handles of another multilevel shopping cart when the multilevel shopping carts are pushed closely together.

13. The manually movable shopping cart according to claim 1, wherein said detached handles are only fastened to said handle support arms and are not directly connected to each other.

14. The manually movable shopping cart according to claim 1, which further comprises a lower basket disposed below said top basket of the multilevel shopping cart.

* * * * *